(12) United States Patent
Pappalardo et al.

(10) Patent No.: US 7,447,716 B2
(45) Date of Patent: Nov. 4, 2008

(54) DATA CODING METHOD AND CORRESPONDING DATA PROCESSING UNIT HAVING A CODING/DECODING CIRCUIT

(75) Inventors: Francesco Pappalardo, Paternò (IT); Agatino Pennisi, Nocera Inferiore (IT)

(73) Assignee: STMicroelectronics S.r.L., Agrate Brianza (IT)

( * ) Notice: Subject to any disclaimer, the term of this patent is extended or adjusted under 35 U.S.C. 154(b) by 755 days.

(21) Appl. No.: 11/018,972

(22) Filed: Dec. 21, 2004

(65) Prior Publication Data
US 2005/0171985 A1    Aug. 4, 2005

(30) Foreign Application Priority Data
Dec. 23, 2003  (IT)  .......................... MI2003A2591

(51) Int. Cl.
*G06F 5/00* (2006.01)
(52) U.S. Cl. .................................... 707/204
(58) Field of Classification Search ................ 708/204
See application file for complete search history.

(56) References Cited

U.S. PATENT DOCUMENTS

| | | | | |
|---|---|---|---|---|
| 4,935,890 A * | 6/1990 | Funyu | .......................... | 708/204 |
| 5,272,654 A * | 12/1993 | Nix | .............................. | 708/204 |
| 6,523,050 B1 * | 2/2003 | Dhablania et al. | ........... | 708/204 |
| 7,236,995 B2 * | 6/2007 | Hinds | ........................... | 708/204 |
| 2004/0117422 A1 * | 6/2004 | Debes et al. | ................. | 708/523 |

* cited by examiner

*Primary Examiner*—David H Malzahn
(74) *Attorney, Agent, or Firm*—Lisa K. Jorgenson; Allen, Dyer, Doppelt, Milbrath & Gilchrist, P.C.

(57) ABSTRACT

The method of coding data within a data processing unit includes a representation as twos-complement and a coded representation of the data. The coded representation is a semi-negated representation. A data processing unit includes a memory device connected bidirectionally to a data bus, itself connected to a processing architecture which includes at least one arithmetic-logic unit. Advantageously, the data processing unit includes at least one data coding/decoding block connected between the processing architecture and the data bus.

23 Claims, 3 Drawing Sheets

| Input Distribution | Programming bits (ctrl[7:0]) | | | | | | | | | | |
|---|---|---|---|---|---|---|---|---|---|---|---|
| | 0x80 | 0x81 | 0x82 | 0x84 | 0x88 | 0x40 | 0x41 | 0x42 | 0x44 | 0x48 |
| Random in [0, $2^{n}-1$] | 0.38% | 0.57% | 0.44% | 0.89% | 0.34% | 0.66% | 0.54% | 0.07% | 0.27% | 0.23% |
| Random in [$-2^{n-1}+1$, $2^{n-1}$] | 0.17% | -0.10% | 0.24% | 0.40% | 1.06% | 0.25% | -0.05% | 0.16% | 0.31% | 0.10% |
| Uniform in [0, $2^{n}-1$] | -0.07% | 0.24% | 0.12% | 0.03% | 0.22% | 0.10% | 0.32% | 0.14% | 0.09% | -0.01% |
| Uniform in [$-2^{n-1}+1$, $2^{n-1}$] | -0.08% | 0.23% | 0.11% | 0.02% | 0.23% | 0.10% | 0.32% | 0.14% | 0.09% | -0.01% |
| Gaussian (μ=0, σ=1) | -71.36% | -69.80% | -60.77% | -59.23% | -59.23% | -59.23% | -57.67% | -43.64% | -47.09% | -47.09% |
| Gaussian (μ=0, σ=10) | -34.33% | -34.20% | -33.73% | -34.17% | -33.14% | -21.77% | -21.65% | -21.17% | -21.62% | -20.58% |
| Exponential (μ=5) | 0.00% | 0.00% | -1.14% | -0.29% | 1.91% | 0.00% | 0.00% | -1.14% | -0.29% | 1.91% |
| Poisson (μ=5) | 0.00% | 0.00% | 0.11% | -1.91% | -5.81% | 0.00% | 0.00% | 0.11% | -1.91% | -5.81% |
| Chi-square, $\chi^2$, (k=5) | 0.00% | 0.00% | -0.39% | -2.68% | -0.82% | 0.00% | 0.00% | 0.39% | -2.68% | -0.32% |
| t-dist. (Student), (k=5) | -69.52% | -67.98% | -60.60% | -57.43% | -57.35% | -57.41% | -55.87% | -48.49% | -45.33% | -45.24% |
| Erlang (k-stage=5, μ=5) | 0.00% | 0.00% | -0.28% | -1.74% | -2.63% | 0.00% | 0.00% | -0.28% | -1.74% | -2.63% |

FIG. 5

DATA CODING METHOD AND CORRESPONDING DATA PROCESSING UNIT HAVING A CODING/DECODING CIRCUIT

FIELD OF THE INVENTION

The present invention relates to data processing, and, more particularly, to a data coding method and corresponding data processing unit wherein the data is represented as twos-complement.

BACKGROUND OF THE INVENTION

The invention relates to a data coding method useful in image processing systems, and the following description refers to that field of application for convenience of illustration only. As is well known, in many digital image processing systems, or Digital Signal Processing (DSP) systems, as well as in microprocessor systems, data is traditionally encoded as twos-complement. This type of coding is actually very useful to also encode the values of negative numbers, so that algebraic operations (arithmetical operations on signed numbers) are easily performed. As a result, the design of arithmetic-logic units performing such algebraic operations can also be simplified.

More precisely, if an integer N coded to a base R and having an integer number K of digits is assumed, such that:

$$N = (n_{K-1} \ldots n_1 n_0)_R$$

the representation $C_R$ of the negative value of this number, also to the base R, will be:

$$C_R = R^K - N$$

In a numerical example, when N equals 7, the following representation to the base 2 is obtained:

$$N(=7) = (0111)_2$$

and the representation of its negative value becomes:

$$CR(=-7) = 2^4 - 7 = 9 = (1001)_2$$

In practice, to obtain the representation to the base 2 of a negative number, it is necessary to perform the ones-complement of the corresponding positive number (i.e. to invert the value of each bit), and then add 1.

In another numerical example, for a number N=00100101 (+37 in the decimal, the first bit being the sign bit), it is:

$$CR = (-37) = 2^8 - 37 = 219 = (11011011)_2$$

i.e.:

TABLE 1

| | | |
|---|---|---|
| 0 0 1 0 0 1 0 1 | | →(+37 as complemented to 2) |
| 1 1 0 1 1 0 1 0 | + | →(complement to 1) |
| 1 | | |
| 1 1 0 1 1 0 1 1 | | →(−37 as complemented to 2) |

From Table 1 above, it is directly seen that the transition from a positive number to a negative number involves switching a large number of bits (the first seven bits, bold-faced in Table 1).

Furthermore, the representation as twos-complement brings about an important problem relating to the extension of the sign bit. To appreciate the problem, consider a transition from $(+1)_{10}$ to $(-1)_{10}$ with a data representation encompassing 8 bits in twos-complement. It is easily seen that this transition corresponds to:

TABLE 2

| | |
|---|---|
| 0 0 0 0 0 0 0 1 | →$(+1)_{10}$ |
| 1 1 1 1 1 1 1 1 | →$(-1)_{10}$ |

In other words, this sign transition involves variation of 7 bits out of 8. This same problem is encountered with representations of sign-less numbers, when from a value $(R^K/2)-1$ one moves to a value $(R^K/2)$, R being the numbering base and K the number of digits used. In this case, taking any base-2 representation of 8 digits (or bits), it is seen that such a transition also involves extensive bit variation. In particular, assuming a numerical example of R=2 and K=8, it is:

$$(R^K/2) - 1 = (2^8/2) - 1 = 127$$

$$(R^K/2) = (2^8/2) = 128$$

And in the eight-digit notation, it is:

TABLE 3

| | |
|---|---|
| 0 1 1 1 1 1 1 1 | →$(+127)_{10}$ |
| 1 0 0 0 0 0 0 0 | →$(+128)_{10}$ | i.e., variation of 8 bits out of 8.

This is to say that variations occurring between symmetrical values about the midpoint of the data representation range are bound to involve considerable variation of bits in the digital representation of the data. In particular, the extensive bit transitions involved in going from one number to another penalize, in terms of power consumption, the arithmetic-logic unit that is processing the transitions. This problem is only in part addressed in the literature, both in connection with the twos-complement representation and with negative numbers.

In particular, in the articles "Minimizing Power Consumption in Digital CMOS Circuits" by S. Chandrakasan and R. W. Brodersen, IEEE Proceedings, vol. 83, No. 4, pages 498-523, April 1995, and "Analytical Estimation of Signal Transition Activity for Word-Level Statistics" by S. Ramprasad, N. R. Shanbhag and I. N. Hajj, IEEE Trans. on Computer-Aided Design of Integrated Circuits and Systems, vol. 16, No. 7, pages 718-733, July 1997, methods of processing negative numbers are described and approaches proposed for overcoming the above critical transactions. These documents specifically teach reducing the switching activity by the adoption of a modulus and sign representation.

In this case, in the respect of the transition from +1 to −1 mentioned above, it is obtained:

TABLE 4

| | |
|---|---|
| 0 0 0 0 0 0 0 1 | →$(+1)_{10}$ |
| 1 0 0 0 0 0 0 1 | →$(-1)_{10}$ | i.e., the sign variation involves changing one bit only.

However, the representation by modulus and sign has two major drawbacks:

a first drawback is the introduction of an additional coding for 0. In fact, it is:

TABLE 5

| 0 0 0 0 0 0 0 0 | →(+0)$_{10}$ |
| 1 0 0 0 0 0 0 0 | →(−0)$_{10}$ |

Therefore, there are two different codings for the number 0, i.e. for the middle value in the representation range.

The second drawback is tied to the first and includes the range of representation being restricted. In fact, whereas in the representation as twos-complement with K bits to a base R all the integers in the $[-R^{K-1}, R^{K-1}]$ range can be represented, in the modulus and sign representation the range becomes $[-(R^{K-1}-1), R^{K-1}-1]$.

The technical problem that underlies this invention is to provide a method of coding digital data, which method can reduce the number of bit switches in specific critical transitions, thereby overcoming the limitations and drawbacks of prior art methods.

SUMMARY OF THE INVENTION

The invention uses, through a simple data coding/decoding system, a modified version of the representation as twos-complement which can reduce the switching activity compared to the traditional representation as twos-complement. In particular, the coding is performed via a purely combinational circuit (using no memory elements).

Based on the above, the technical problem is addressed by a method of coding data within a data processor, wherein a representation of the data is provided as twos-complement, wherein a coded representation of the data is also provided. In particular, the coded representation is a semi-negated representation.

In addition, the problem is addressed by a data processing unit, wherein a memory device is connected bidirectionally to a data bus, itself connected to a processing architecture which includes at least one arithmetic-logic unit, the data processing unit including at least one data coding/decoding block placed between the processing architecture and the data bus.

BRIEF DESCRIPTION OF THE DRAWINGS

The features and advantages of the method and the data processing unit of this invention should be apparent from the following description of embodiments thereof, given by way of non-limitative examples with reference to the accompanying drawings.

DETAILED DESCRIPTION OF THE PREFERRED EMBODIMENTS

To better appreciate the invention, one should start from an observation of the data stream, in particular as this proceeds inside a data processor. Not to be overlooked is that a processor should process data in accordance with a law that encompasses the type of the processing and the type of the data. However, data variance should neither cause data "overflow" (going beyond the upper limit of the data coding range) nor "underflow" (dropping below the lower limit of the data range of representation) to be incurred during the processing. In particular, in selecting a data processor, the size of the data bus, i.e. the number of bits per data item, should be selected according to the data to be processed, such that no over- or underflow, and therefore no calculation errors, will be incurred during the various operations.

Figure 1:
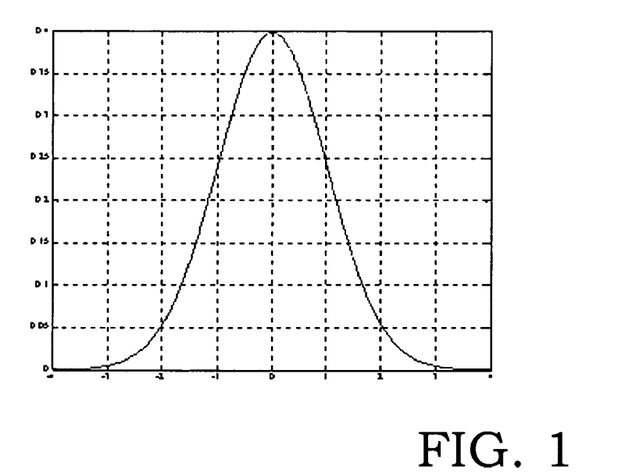
FIG. 1 is a graph showing the pattern of a probability distribution of Gaussian type.

In other words, the processor is selected such that the data processing operations are centralized on the actual data range, i.e.: about 0 for the positive and negative numbers; and about a value $2^{K-1}$ for the positive numbers (having K bits) alone. Thus, the probability distribution of the data, when of Gaussian type, will have a maximum about these values as shown schematically in FIG. 1.

It matters to observe here that the closer the data lies to the range midpoint, the more numerous the bit transitions will be as it shifts to its mirror-image with respect to the range midpoint. Consider, in fact, the numerical examples here below.

EXAMPLE 1

In a representation as twos-complement, i.e. with the 0 at the range midpoint, it is:

| 0 0 0 0 0 0 0 1 | →(+1)$_{10}$ |
| 1 1 1 1 1 1 1 1 | →(−1)$_{10}$ | i.e., a variation of 7 bits out of 8.

EXAMPLE 2

In a representation of sign-less numbers, i.e. with the range centralized about $2^{K-1}$ (where K=8), it is:

| 0 1 1 1 1 1 1 1 | →(+127)$_{10}$ |
| 1 0 0 0 0 0 0 0 | →(+128)$_{10}$ | i.e., a variation of 8 bits out of 8.

A final observation is that the farther the data lies from the range midpoint, the less numerous the bit transitions will be as the data shifts to its mirror-image with respect to the range midpoint. In actual practice, and as shown here above in connection with the Gaussian distribution of FIG. 1, the probability of the data being processed decreases in the direction away from the range midpoint. Briefly, the observations made about the data stream through a processor reveal that a data representation as twos-complement fails to result in reduced power consumption by the processor.

Advantageously in this invention, a data coding method is proposed which can reduce the switching activity during the processing, with no adverse rebound on the complexity of the data processor architecture and, more important, without using more power than the coded representation is capable of reducing. In particular, since the representation as twos-complement is in all cases best for a data processing architecture that includes adders, subtractors and multipliers of signed (positive and negative) numbers, the inventive method provides, as an advantage, a representation as twos-complement for the processing area and a "semi-negated" representation type of conversion/deconversion for going through a processor with least variation of bits.

In particular, the "semi-negated" representation of data encompassing n bits is obtained by the following rule: negation of bits n−2 to 0 if the n−1 bit equals zero. To obtain the semi-negated representation of n-bit data, this coding method provides the following steps:
a) the n-bit data represented as twos-complement is input;
b) if the n−1 bit (Most Significant Bit, or MSB) equals 1, then: all the bits from bit n−2 to bit 0, are inverted, otherwise: the data expressed as twos-complement is left unaltered;
c) the n-bit data in semi-negated representation is output.

It can be seen that the coding method, specifically the semi-negated representation of data, allows the switching activity to be drastically cut down in going to the mirror-image data with respect to the midpoint of the representation range.

The following are numerical examples.

EXAMPLE 1

1) To represent signed numbers, i.e. with the representation range centered at 0, it is:

| | |
|---|---|
| 0 0 0 0 0 0 0 1 | →(+1)$_{10}$ |
| 1 0 0 0 0 0 0 0 | →(−1)$_{10}$ | i.e., a variation of only 2 bits out of 8.

2) To represent unsigned numbers, i.e. with the representation range centered at $2^{K-1}$ (where K=8), it is:

| | |
|---|---|
| 0 1 1 1 1 1 1 1 | →(+127)$_{10}$ |
| 1 1 1 1 1 1 1 1 | →(+128)$_{10}$ | i.e., a variation of one bit out of 8.

Figure 2:
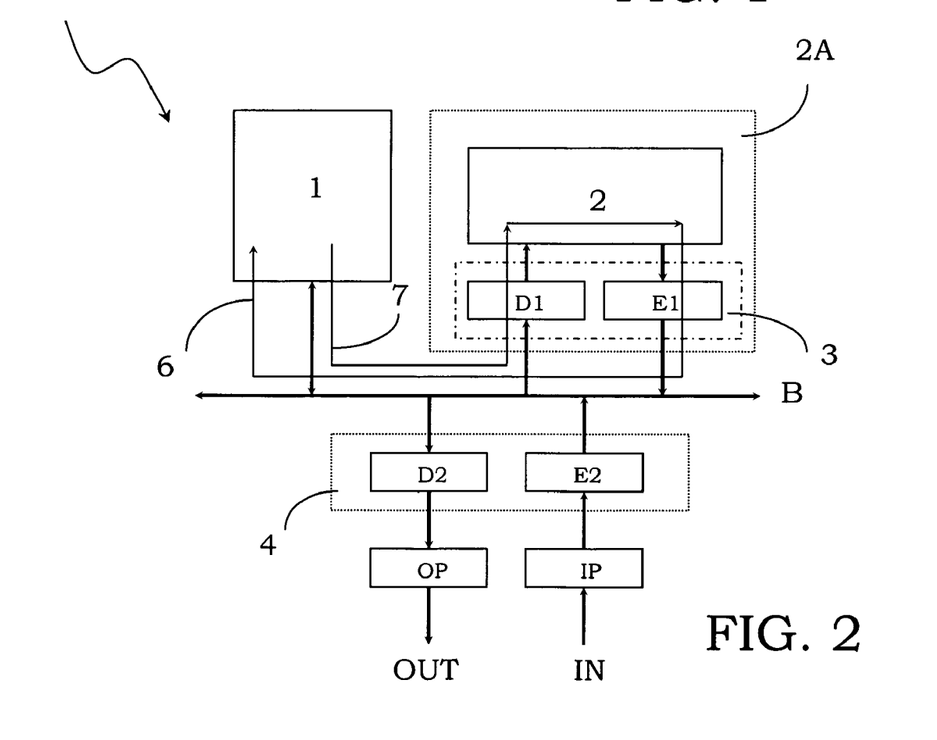
FIG. 2 is a schematic diagram showing a data processor that uses the coding method of this invention.

With reference to the drawing Figures, specifically to FIG. 2, a data processing unit 10 that operates on the coding method of this invention will now be described. In particular, the processing unit 10 comprises a memory device 1 which is connected bidirectionally to a data bus B, the latter being in turn connected to a processing architecture 2 wherein at least one arithmetic-logic unit includes suitable adder, subtractor and multiplier blocks.

To perform in accordance with the coding method of the invention, the processing unit 10 advantageously includes a data coding/decoding block 3 wherein the data coding/decoding is based on the coded representation, specifically the aforementioned semi-negated representation, the block 3 being placed between the processing architecture 2 and the data bus B. A processing architecture 2A incorporating the coding/decoding block 3 as an integral part thereof may be provided. In particular, the coding/decoding block 3 includes at least one encoder E1, having an input terminal connected to the processing architecture 2 and an output terminal connected to the data bus B. and one decoder D1 which has an input terminal connected to the data bus B and an output terminal connected to the processing architecture 2.

In addition, the processing unit 10 includes at least one input stage IP and one output stage OP, both connected to the data bus B and respective input and output terminals IN and OUT of the processor 10.

An additional coding/decoding block 4 may be provided between the data bus and the input/output stages IP, OP for the purpose of matching the data representation standard in the processor 10 to the outside world. Arrowheads 6 and 7 show the directions over the data bus B along which the data stream is strongest. It should be noted that by coding the data as a "semi-negated" representation, it becomes possible to minimize:
1) the transitions against variations about the midpoint of the representation range, for both positive/negative numbers and positive numbers alone;
2) the number of blocks comprising the data processing architecture 2 in a semi-negated representation; and
3) the area requirements for the coding/decoding block 3.

Furthermore, the selected coding representation, i.e. the "semi-negated" representation according to the invention, advantageously exhibits an important feature: its inverse function is the same as the coding function. In other words, the encoder is the same construction as the decoder.

Figure 3:
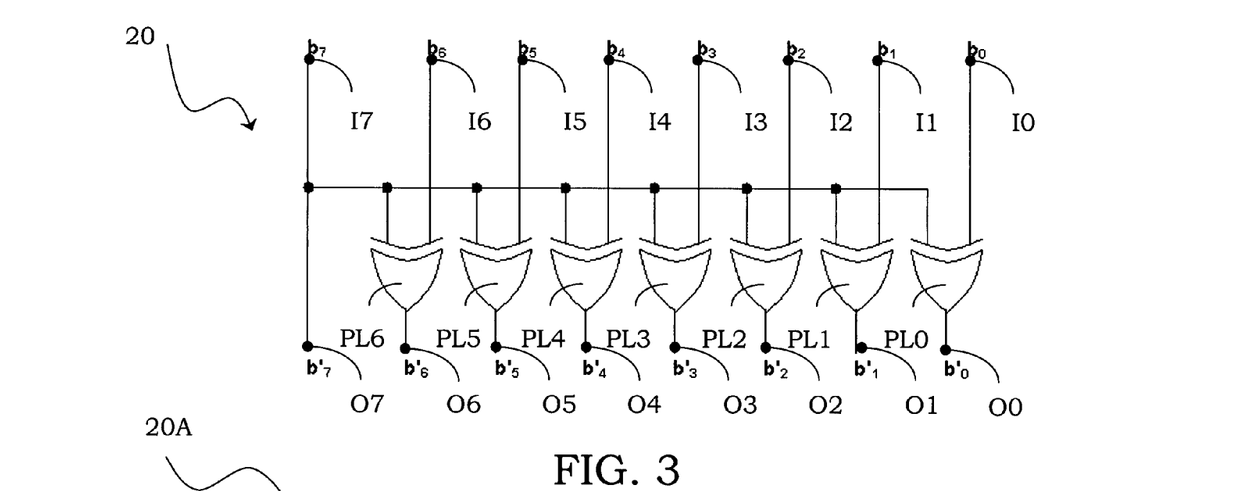
FIG. 3 is a schematic diagram showing a first embodiment of a portion of the processor in FIG. 2.

A first embodiment of a coding/decoding circuit according to the invention is generally shown in schematic form at 20 in FIG. 3. The coding/decoding circuit 20 is shown in connection with a representation over n=8 bits. The coding/decoding circuit 20 has plural inputs I0 to I7, whereat the bits b0-b7 that correspond to a digital representation of a data item are received, and plural outputs O0 to O7 whereat the bits b0'-b7' that correspond to the input data coding are output.

The coding/decoding circuit 20 includes a number n−1 of logic gates PL0 to PL6, n being the number of bits in the digital data representation. (In the example of FIG. 3, there are 7 logic gates because an 8-bit digital representation has been assumed.) In particular, each logic gate PL0, . . . , PL6 has an input terminal connected to a respective input I0, . . . , I6 of the coding/decoding circuit, and has an output terminal connected to a respective output O0, . . . , O6 of the coding/decoding circuit. The last input I7 and last output O7 of the coding/decoding circuit 20 are instead connected directly to each other and to respective second input terminals of every logic gate PL0 to PL6. In the example of FIG. 3, the logic gates PLn are XOR types.

The coding/decoding circuit 20 shown in FIG. 3 is effective to produce coded representations in a "semi-negated" form, and is a fixed type. In particular, the circuit shown will apply the coding to the n−2th bit onwards. In this case, if the most significant bit b7 is 1, all the bits from b6 to b0 will be coded (inverted). Of course, the above reflects an extreme case. Anyhow, a smaller group of bits could be selected, again in the fixed mode, depending on the type of data that flow through the bus of the processing unit 10.

Figure 4:
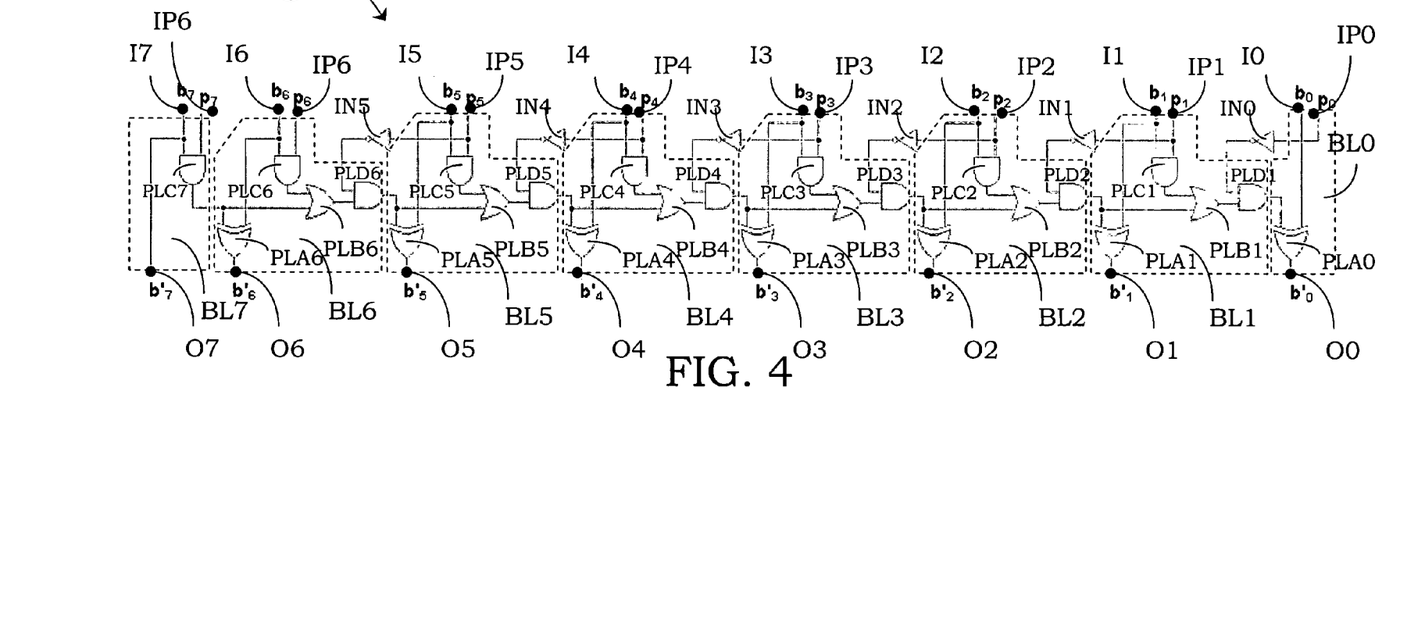
FIG. 4 is a schematic diagram showing a second embodiment of the processor portion shown in FIG. 2.

A programmable architecture could be provided for the coding/decoding circuit as shown generally in schematic form at 20A in FIG. 4. In particular, the programmable coding/decoding circuit 20A is bound to be a more complicated architecture than the circuit of FIG. 3, but allows setting the bit from which the applied coding is to start (i.e., not necessarily from the n−2th bit through).

In any case, the programmable coding/decoding circuit 20A has a plurality of inputs I0 to I7 adapted to receive bits b0-b7 corresponding to the digital representation of a data item, and has a plurality of outputs O0 to O7 adapted to output bits b0'-b7' corresponding to the input data coding. It also has a plurality of program inputs IP0-IP7 on which the program bits p0-p7 are received.

The programmable coding/decoding circuit 20A comprises a plurality of logic blocks BL0, . . . , BL7 placed between the respective input and output terminals I0, . . . , I7 and O0, . . . , O7, the logic blocks being cascade-connected together. The programmable coding/decoding circuit 20A further comprises a plurality of logic inverters IN0, ..., IN5 arranged to connect the first n−2 program inputs IP0, ..., IP5 to the following logic blocks BL1, ..., BL6 in the cascade.

In particular, the first logic block BL0 includes a first logic gate PLA0 which has an input terminal connected to a corresponding input I0 of the programmable coding/decoding circuit 20A, an output terminal connected to a corresponding output O0 of the programmable coding/decoding circuit 20A, and a second input terminal connected to the next logic block BL1.

The following n−2 logic blocks BL1, ..., BL6 have the same construction. Each logic block, such as BL1, includes a first logic gate PLA1 which has an input terminal connected to a corresponding input I1 of the programmable coding/decoding circuit 20A, an output terminal connected to a corresponding output O1 of the programmable coding/decoding circuit 20A, and a second input terminal connected to the next logic block BL2. The logic block BL1 further includes a second logic gate PLB1 which has an input terminal connected to the second input terminal of the first logic gate PLA1, and has a second input terminal connected to an output terminal of a third logic gate PLC1 having a first input terminal connected to the input I1 of the programmable coding/decoding circuit 20A and a second input terminal connected to the program input IP1 of the programmable coding/decoding circuit 20A.

The second logic gate PLB1 also has an output terminal connected to an input terminal of a fourth logic gate PLD1, itself having an output terminal connected to the second input terminal of the first logic gate PL0 in the preceding logic block BL0, and a second input terminal connected, via a logic inverter IN0, to the program input IP0 of the preceding logic block BL0.

Finally, the last logic block BL7 only includes the third logic gate PLC7 which has a first input terminal connected to the input I7 of the programmable coding/decoding circuit 20A and to the output O7 of the programmable coding/decoding circuit 20A, a second input terminal connected to the program input IP7 of the programmable coding/decoding circuit 20A, and an output terminal connected to the second input terminal of the first logic gate PLA6 in the preceding logic block BL6. In the example of FIG. 4, the first logic gates PLAn are XOR gates, the second logic gates PLBn are OR gates, and the third and fourth logic gates PLCn and PLDn are AND gates.

Advantageously, the bits to be coded by the circuit 20A can be selected according to the configuration that has been chosen for the eight program bits p7, ..., p0. Here, up to 2 "significant sets" of bits (a "significant set" being at least two adjacent bits) can be selected for coding by an appropriate choice of the program bits p7, ..., p0. In any case, it is possible to program in an optimum way how many of and which bits should be coded, according to the bus width and the type of data.

Advantageously, the coding/decoding circuits described above afford a drastic reduction in power consumption for a trivial increase in area requirement, since they contain a limited number of logic gates. In addition, a coding/decoding circuit of the type described above can be integrated to the processing architecture 2 for an increase in area requirement tending to 0. In particular, it should be noted that to perform a subtraction of the A-B type as twos-complement, an operation A+(−B) is actually performed, i.e. A is added the complemented value of B.

In practice, however, complementing the value of B is inverting it and adding 1. In the coding method of this invention, specifically based upon the "semi-negated" representation, the operation becomes one of inverting the bit n−1 alone and adding 1. In other words, according to the invention, the ones-complement can be performed using, as the coding/decoding circuit, an existing circuit in the processing architecture 2 which is adapted to effect the semi-negated conversion of this invention.

Advantageously when compared to the modulus and sign coding that requires a reduction of one unity in the data representation range (in particular for n=8, there is no representation of −8, while −0 and +0 are represented), the coding method of this invention does away with it all. Shown in Tables 6, 7 and 8 below are bit variations for representations with n=8 constructed by standard methods (twos-complement and modulus/sign) compared to the "semi-negated" type of coding method according to the invention.

TABLE 6

| | | −8 1000 | −7 1001 | −6 1010 | −5 1011 | −4 1100 | −3 1101 | −2 1110 | −1 1111 | +0 0000 | +1 0001 | +2 0010 | +3 0011 | +4 0100 | +5 0101 | +6 0110 | +7 0111 |
|---|---|---|---|---|---|---|---|---|---|---|---|---|---|---|---|---|---|
| | | (twos-complement) | | | | | | | | | | | | | | | |
| −8 | 1000 | 0 | 1 | 1 | 2 | 1 | 2 | 2 | 3 | 1 | 2 | 2 | 3 | 2 | 3 | 3 | 4 |
| −7 | 1001 | 1 | 0 | 2 | 1 | 2 | 1 | 3 | 2 | 2 | 1 | 3 | 2 | 3 | 2 | 4 | 3 |
| −6 | 1010 | 1 | 2 | 0 | 1 | 2 | 3 | 1 | 2 | 2 | 3 | 1 | 2 | 3 | 4 | 2 | 3 |
| −5 | 1011 | 2 | 1 | 1 | 0 | 3 | 2 | 2 | 1 | 3 | 2 | 2 | 1 | 4 | 3 | 3 | 2 |
| −4 | 1100 | 1 | 2 | 2 | 3 | 0 | 1 | 1 | 2 | 2 | 3 | 3 | 4 | 1 | 2 | 2 | 3 |
| −3 | 1101 | 2 | 1 | 3 | 2 | 1 | 0 | 2 | 1 | 3 | 2 | 4 | 3 | 2 | 1 | 3 | 2 |
| −2 | 1110 | 2 | 3 | 1 | 2 | 1 | 2 | 0 | 1 | 3 | 4 | 2 | 3 | 2 | 3 | 1 | 2 |
| −1 | 1111 | 3 | 2 | 2 | 1 | 2 | 1 | 1 | 0 | 4 | 3 | 3 | 2 | 3 | 2 | 2 | 1 |
| +0 | 0000 | 1 | 2 | 2 | 3 | 2 | 3 | 3 | 4 | 0 | 1 | 1 | 2 | 1 | 2 | 2 | 3 |
| +1 | 0001 | 2 | 1 | 3 | 2 | 3 | 2 | 4 | 3 | 1 | 0 | 2 | 1 | 2 | 1 | 3 | 2 |
| +2 | 0010 | 2 | 3 | 1 | 2 | 3 | 4 | 2 | 3 | 1 | 2 | 0 | 1 | 2 | 3 | 1 | 2 |
| +3 | 0011 | 3 | 2 | 2 | 1 | 4 | 3 | 3 | 2 | 2 | 1 | 1 | 0 | 3 | 2 | 2 | 1 |
| +4 | 0100 | 2 | 3 | 3 | 4 | 1 | 2 | 2 | 3 | 1 | 2 | 2 | 3 | 0 | 1 | 1 | 2 |
| +5 | 0101 | 3 | 2 | 4 | 3 | 2 | 1 | 3 | 2 | 2 | 1 | 3 | 2 | 1 | 0 | 2 | 1 |
| +6 | 0110 | 3 | 4 | 2 | 3 | 2 | 3 | 1 | 2 | 2 | 3 | 1 | 2 | 1 | 2 | 0 | 1 |
| +7 | 0111 | 4 | 3 | 3 | 2 | 3 | 2 | 2 | 1 | 3 | 2 | 2 | 1 | 2 | 1 | 1 | 0 |

TABLE 7

(Modulus and Sign)

|  |  | −7<br>1111 | −6<br>1110 | −5<br>1101 | −4<br>1100 | −3<br>1011 | −2<br>1010 | −1<br>1001 | −0<br>1000 | +0<br>0000 | +1<br>0001 | +2<br>0010 | +3<br>0011 | +4<br>0100 | +5<br>0101 | +6<br>0110 | +7<br>0111 |
|---|---|---|---|---|---|---|---|---|---|---|---|---|---|---|---|---|---|
| −7 | 1111 | 0 | 1 | 1 | 2 | 1 | 2 | 2 | 3 | 4 | 3 | 3 | 2 | 3 | 2 | 2 | 1 |
| −6 | 1110 | 1 | 0 | 1 | 2 | 2 | 1 | 3 | 2 | 3 | 4 | 2 | 3 | 2 | 3 | 1 | 2 |
| −5 | 1101 | 1 | 1 | 0 | 1 | 2 | 3 | 1 | 2 | 3 | 2 | 4 | 3 | 2 | 1 | 3 | 2 |
| −4 | 1100 | 2 | 2 | 1 | 0 | 3 | 2 | 2 | 1 | 2 | 3 | 3 | 4 | 1 | 2 | 2 | 3 |
| −3 | 1011 | 1 | 2 | 2 | 3 | 0 | 1 | 1 | 2 | 3 | 2 | 2 | 1 | 4 | 3 | 3 | 2 |
| −2 | 1010 | 2 | 1 | 3 | 2 | 1 | 0 | 1 | 2 | 2 | 3 | 1 | 2 | 3 | 4 | 2 | 3 |
| −1 | 1001 | 2 | 3 | 1 | 2 | 1 | 1 | 0 | 1 | 2 | 1 | 3 | 2 | 3 | 2 | 4 | 3 |
| −0 | 1000 | 3 | 2 | 2 | 1 | 2 | 2 | 1 | 0 | 1 | 2 | 2 | 3 | 2 | 3 | 3 | 4 |
| +0 | 0000 | 4 | 3 | 3 | 2 | 3 | 2 | 2 | 1 | 0 | 1 | 1 | 2 | 1 | 2 | 2 | 3 |
| +1 | 0001 | 3 | 4 | 2 | 3 | 2 | 3 | 1 | 2 | 1 | 0 | 1 | 2 | 2 | 1 | 3 | 2 |
| +2 | 0010 | 3 | 2 | 4 | 3 | 2 | 1 | 3 | 2 | 1 | 1 | 0 | 1 | 2 | 3 | 1 | 2 |
| +3 | 0011 | 2 | 3 | 3 | 4 | 1 | 2 | 2 | 3 | 2 | 2 | 1 | 0 | 3 | 2 | 2 | 1 |
| +4 | 0100 | 3 | 2 | 2 | 1 | 4 | 3 | 3 | 2 | 1 | 2 | 2 | 3 | 0 | 1 | 1 | 2 |
| +5 | 0101 | 2 | 3 | 1 | 2 | 3 | 4 | 2 | 3 | 2 | 1 | 3 | 2 | 1 | 0 | 1 | 2 |
| +6 | 0110 | 2 | 1 | 3 | 2 | 3 | 2 | 4 | 3 | 2 | 3 | 1 | 2 | 1 | 1 | 0 | 1 |
| +7 | 0111 | 1 | 2 | 2 | 3 | 2 | 3 | 3 | 4 | 3 | 2 | 2 | 1 | 2 | 2 | 1 | 0 |

TABLE 8

("Semi-negated" Representation)

|  |  | −8<br>1111 | −7<br>1110 | −6<br>1101 | −5<br>1100 | −4<br>1011 | −3<br>1010 | −2<br>1001 | −1<br>1000 | +0<br>0000 | +1<br>0001 | +2<br>0010 | +3<br>0011 | +4<br>0100 | +5<br>0101 | +6<br>0110 | +7<br>0111 |
|---|---|---|---|---|---|---|---|---|---|---|---|---|---|---|---|---|---|
| −8 | 1111 | 0 | 1 | 1 | 2 | 1 | 2 | 2 | 3 | 4 | 3 | 3 | 2 | 3 | 2 | 2 | 1 |
| −7 | 1110 | 1 | 0 | 2 | 1 | 2 | 1 | 3 | 2 | 3 | 4 | 2 | 3 | 2 | 3 | 1 | 2 |
| −6 | 1101 | 1 | 2 | 0 | 1 | 2 | 3 | 1 | 2 | 3 | 2 | 4 | 3 | 2 | 1 | 3 | 2 |
| −5 | 1100 | 2 | 1 | 1 | 0 | 3 | 2 | 2 | 1 | 2 | 3 | 3 | 4 | 1 | 2 | 2 | 3 |
| −4 | 1011 | 1 | 2 | 2 | 3 | 0 | 1 | 1 | 2 | 3 | 2 | 2 | 1 | 4 | 3 | 3 | 2 |
| −3 | 1010 | 2 | 1 | 3 | 2 | 1 | 0 | 2 | 1 | 2 | 3 | 1 | 2 | 3 | 4 | 2 | 3 |
| −2 | 1001 | 2 | 3 | 1 | 2 | 1 | 2 | 0 | 1 | 2 | 1 | 3 | 2 | 3 | 2 | 4 | 3 |
| −1 | 1000 | 3 | 2 | 2 | 1 | 2 | 1 | 1 | 0 | 1 | 2 | 2 | 3 | 2 | 3 | 3 | 4 |
| +0 | 0000 | 4 | 3 | 3 | 2 | 3 | 2 | 2 | 1 | 0 | 1 | 1 | 2 | 1 | 2 | 2 | 3 |
| +1 | 0001 | 3 | 4 | 2 | 3 | 2 | 3 | 1 | 2 | 1 | 0 | 2 | 1 | 2 | 1 | 3 | 2 |
| +2 | 0010 | 3 | 2 | 4 | 3 | 2 | 1 | 3 | 2 | 1 | 2 | 0 | 1 | 2 | 3 | 1 | 2 |
| +3 | 0011 | 2 | 3 | 3 | 4 | 1 | 2 | 2 | 3 | 2 | 1 | 1 | 0 | 3 | 2 | 2 | 1 |
| +4 | 0100 | 3 | 2 | 2 | 1 | 4 | 3 | 3 | 2 | 1 | 2 | 2 | 3 | 0 | 1 | 1 | 2 |
| +5 | 0101 | 2 | 3 | 1 | 2 | 3 | 4 | 2 | 3 | 2 | 1 | 3 | 2 | 1 | 0 | 2 | 1 |
| +6 | 0110 | 2 | 1 | 3 | 2 | 3 | 2 | 4 | 3 | 2 | 3 | 1 | 2 | 1 | 2 | 0 | 1 |
| +7 | 0111 | 1 | 2 | 2 | 3 | 2 | 3 | 3 | 4 | 3 | 2 | 2 | 1 | 2 | 1 | 1 | 0 |

It can be appreciated from the above Tables that in the two standard representation modes, namely tow-complement and Moulus/Sign, the most important transitions occur about the middle of the representation range, whereas with the coding method of this invention, namely in the Semi-negated Representation mode, the transitions about the middle of the representation range are definitely less notable.

Figure 5:
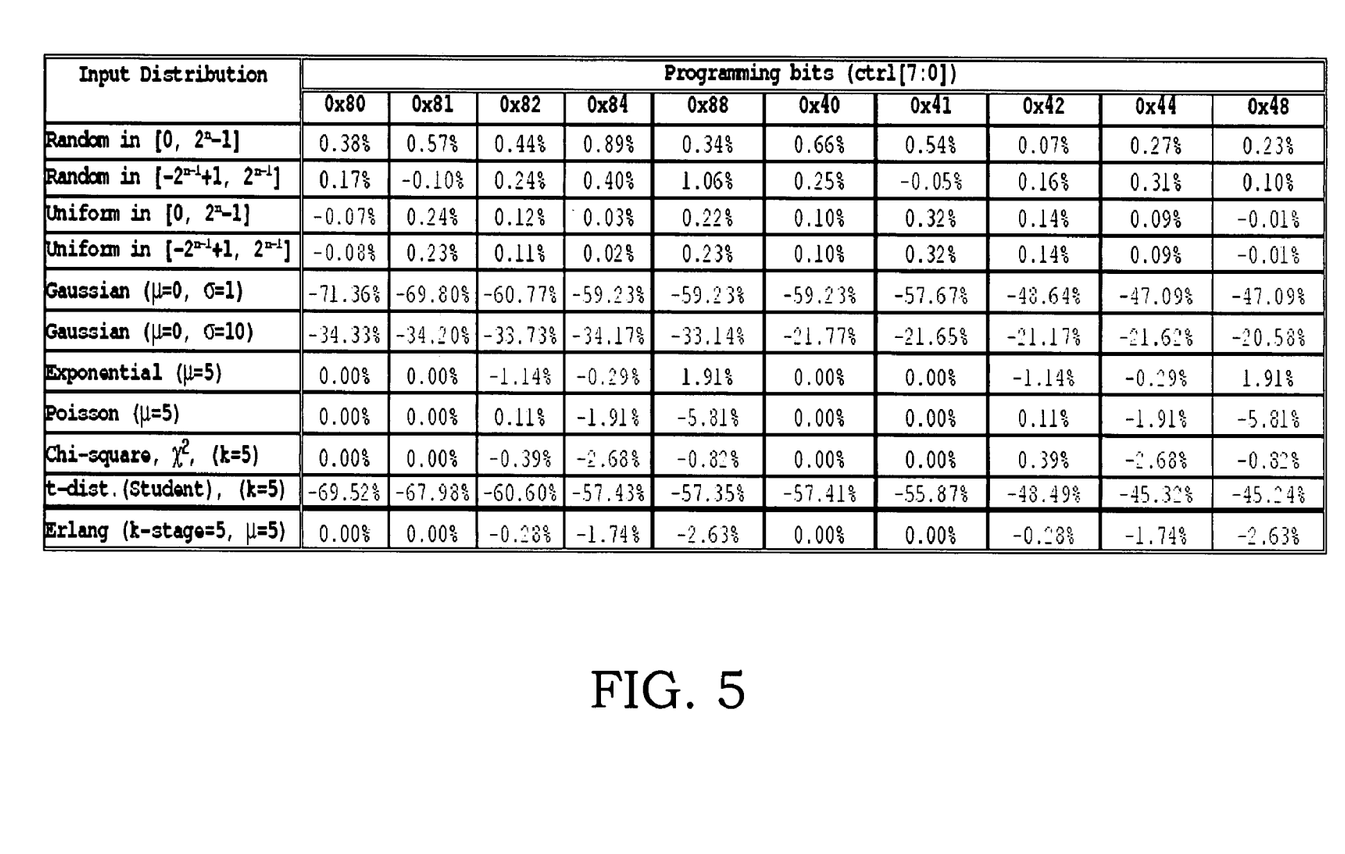
FIG. 5 is a table illustrating the comparative results of a simulation of the inventive method and prior art methods.

Simulations at the RTL level of the programmable architecture (also for n=8) have been carried out and FIG. 5 shows the results as percent reduction in switching activity. It can be seen that the programmable architecture of coding/decoding circuit 20 that implements the coding method of the invention further affords notably reduced transitions over the data bus (and therefore, reduced dynamic power of processor 10, according to the distribution of the data flowed through the bus.

Additional simulations carried out with a processor VLIW ST220 (L×2) as provided by STMicroelectronics S.r.l., the Assignee, have shown reductions of 10-14% in switching activity.

That which is claimed is:

1. A method of coding data within a data processing unit comprising:

providing a twos-complement representation of the data; and providing a coded representation of the data, wherein the coded representation of the data comprises a semi-negated representation.

2. A data coding method according to claim 1, wherein providing the coded representation further comprises converting data from the twos-complement representation to the coded representation; and further comprising deconverting from the coded representation to a twos-complement representation.

3. A data coding method according to claim 1, wherein the semi-negated representation of a data item represented over n bits is obtained by negation of bits n−2 to 0 if n−1 bit equals zero.

4. A data coding method according to claim 3, wherein providing the semi-negated representation further comprises:

inputting an n-bit data item as twos-complement;

inverting all bits of the n-bit data item from bit n−2 to bit 0 if bit n−1 equals 1;

leaving the n-bit data item unaltered if bit n−1 does not equal 1; and outputting the n-bit data item as the semi-negated representation.

5. A method of coding data within a data processing unit comprising:
provSiding a twos-complement representation of the data; and
converting data from the twos-complement representation to a coded representation, wherein the coded representation of the data comprises a semi-negated representation.

6. A data coding method according to claim 5, further comprising deconverting from the coded representation to a twos-complement representation.

7. A data coding method according to claim 5, wherein the semi-negated representation of a data item represented over n bits is obtained by negation of bits n−2 to 0 it n−1 bit equals zero.

8. A data coding method according to claim 7, further comprising:
inputting an n-bit data item as twos-complement;
inverting all bits of the n-bit data item from bit n−2 to bit 0 if bit n−1 equals 1;
leaving the n-bit data item unaltered if bit n−1 does not equal 1; and
outputting the n-bit data item as the semi-negated representation.

9. A data processing unit comprising:
a memory device;
a data bus bidirectionally connected to the memory device;
a processing architecture including at least one arithmetic-logic unit and connected to the data bus;
at least one data coding/decoding block connecting the processing architecture and the data bus, wherein the coding/decoding block comprises
at least one encoder having an input terminal connected to the processing architecture and an output terminal connected to the data bus, and
a decoder having an input terminal connected to the data bus and an output terminal connected to the processing architecture,
wherein the encoder and decoder include a same code/decode configuration.

10. A data processing unit according to claim 9, further comprising at least one input stage and one output stage connected to the data bus and to respective input and output terminals of the processor.

11. A data processing unit according to claim 10, further comprising an additional coding/decoding block connected between the data bus and the input and output stages.

12. A data processing unit according to claim 9, wherein said coding/decoding block comprises:
a plurality of inputs receiving bits that correspond to a twos-complement representation of an input data;
a plurality of outputs for outputting bits that correspond to a coded representation of the input data;
a plurality of logic gates having an input terminal connected to a respective input of the plurality of inputs, a last input and last output of the coding/decoding block being connected directly to each other and to respective second input terminals of all the logic gates.

13. A data processing unit according to claim 12, wherein the logic gates comprise XOR gates.

14. A data processing unit according to claim 9, wherein the coding/decoding block comprises:
a plurality of inputs for receiving bits that correspond to a representation as twos-complement of an input data;
a plurality of outputs for outputting bits that correspond to a coded representation of the input data;
a plurality of logic blocks connected between the input and outputs and cascade connected together; and
a plurality of logic inverters arranged to connect respective program inputs to the cascaded logic blocks, the program inputs receiving respective program bits.

15. A data processing unit according to claim 14, wherein the logic blocks include respective first logic gates having an input terminal connected to a corresponding input of the coding/decoding block, an output terminal connected to a corresponding output of the coding/decoding block, and a second input terminal connected to a next logic block in the cascade.

16. A data processing unit according to claim 15, further comprising a first logic block including a first logic gate having an input terminal connected to a corresponding input of the coding/decoding block, an output terminal connected to a corresponding output of the coding/decoding block, and a second input terminal connected to a next logic block in the cascade.

17. A data processing unit according to claim 15, further comprising a last logic block including a logic gate having a first input terminal connected to a respective input and respective output of the coding/decoding block, a second input terminal connected to a respective program input of the coding/decoding block, and an output terminal connected to the second input terminal of a respective first logic gate of a preceding logic block in the cascade.

18. A data processing unit according to claim 15, wherein the logic blocks further include respective second logic gates having an input terminal connected to the second input terminal of the respective first logic gates and a second input terminal connected to an output terminal of respective third logic gates, the respective third logic gates having a first input terminal connected to the inputs of the coding/decoding block, and a second input terminal connected to the program inputs of the coding/decoding block.

19. A data processing unit according to claim 18, wherein the second logic gates also have an output terminal connected to an input terminal of respective fourth logic gates, the respective fourth logic gates having an output terminal connected to the second input terminal of the first logic gates of preceding logic blocks in the cascade, and have a second input terminal connected via respective logic inverters to the program inputs for the preceding logic blocks in the cascade.

20. A data processing unit according to claim 19, wherein the first logic gates comprise XOR gates, the second logic gates comprise OR gates, and the third and fourth logic gates comprise AND gates.

21. A data processing unit according to claim 9, wherein the coding/decoding circuit is incorporated into the processing architecture.

22. A data processing unit according to claim 21, wherein the coding/decoding circuit comprises a ones-complement circuit.

23. A data processing unit according to claim 9, wherein the coding/decoding block is integrated with the processing architecture.

* * * * *

UNITED STATES PATENT AND TRADEMARK OFFICE
CERTIFICATE OF CORRECTION

PATENT NO. : 7,447,716 B2  Page 1 of 1
APPLICATION NO. : 11/018972
DATED : November 4, 2008
INVENTOR(S) : Francesco Pappalardo and Agatino Pennisi It is certified that error appears in the above-identified patent and that said Letters Patent is hereby corrected as shown below:

Column 9, Line 45   Delete: "tow"
                    Insert: --two--

Column 9, Line 46   Delete: "Moulus"
                    Insert: --Modulus--

Column 9, Line 57   Delete: "10,"
                    Insert: --10),--

Signed and Sealed this

Twenty-fourth Day of February, 2009

JOHN DOLL
*Acting Director of the United States Patent and Trademark Office*